United States Patent
Silberstein et al.

(10) Patent No.: US 9,311,377 B2
(45) Date of Patent: Apr. 12, 2016

(54) METHOD AND APPARATUS FOR PERFORMING SERVER HANDOFF IN A NAME-BASED CONTENT DISTRIBUTION SYSTEM

(71) Applicant: Palo Alto Research Center Incorporated, Palo Alto, CA (US)

(72) Inventors: Rebecca Lynn Braynard Silberstein, Sunnyvale, CA (US); Michael F. Plass, Mountain View, CA (US); Roger C. Meike, Emerald Hills, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 226 days.

(21) Appl. No.: 14/079,448

(22) Filed: Nov. 13, 2013

(65) Prior Publication Data

US 2015/0134612 A1    May 14, 2015

(51) Int. Cl.
G06F 7/00 (2006.01)
G06F 17/30 (2006.01)
H04L 29/08 (2006.01)

(52) U.S. Cl.
CPC ...... G06F 17/30575 (2013.01); H04L 67/1031 (2013.01); H04L 67/1095 (2013.01); H04L 67/2842 (2013.01); H04L 67/327 (2013.01)

(58) Field of Classification Search
None
See application file for complete search history.

(56) References Cited

U.S. PATENT DOCUMENTS 4,309,569 A   1/1982   Merkle
4,921,898 A   5/1990   Lenney
5,070,134 A   12/1991  Oyamada
5,110,856 A   5/1992   Oyamada
5,506,844 A   4/1996   Rao
5,629,370 A   5/1997   Freidzon
(Continued)

FOREIGN PATENT DOCUMENTS

DE   1720277 A1    6/1967
DE   19620817 A1   11/1997
(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
(Continued)

*Primary Examiner* — Uyen Le
(74) *Attorney, Agent, or Firm* — Shun Yao; Park, Vaughan, Fleming & Dowler LLP

(57) ABSTRACT

A server-handoff system facilitates replicating or migrating a data collection or service to one or more alternative servers of a distributed service. During operation, the system can detect a data-handoff condition for migrating or replicating data to an alternative or newly started server, and determines a namespace that is to be migrated or replicated. The namespace includes a data collection or an application publication space associated with one or more structured name prefixes. The system then identifies the alternative servers to which the namespace is to be replicated, and synchronizes a namespace configuration with the alternative content producer. The namespace configuration identifies a set of data items from the namespace which facilitates the alternative content producer to host the data or service. The alternative content producer can use the namespace configuration to obtain the data items associated with the namespace before hosting the data or service.

24 Claims, 9 Drawing Sheets

(56) References Cited

U.S. PATENT DOCUMENTS

| | | |
|---|---|---|
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1* | 4/2002 | Skiba .............. G06F 3/0608 707/999.202 |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1* | 7/2012 | Zheng ............. G06F 11/1458 711/114 |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |

(56) References Cited

U.S. PATENT DOCUMENTS

| | | |
|---|---|---|
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1* | 9/2008 | Tanaka ............... G06F 3/061 718/105 |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1* | 12/2009 | Shitomi ............... G06F 3/0605 |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | Van Der Linden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |

(56) References Cited

U.S. PATENT DOCUMENTS

| | | |
|---|---|---|
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

Detti et al., "Supporting the Web with an information centric network that routes by name", Aug. 2012, Computer Networks 56, pp. 3705-3702.

Garcia-Luna-Aceves et al., "Automatic Routing Using Multiple Prefix Labels", 2012, IEEE, Ad Hoc and Sensor Networking Symposium.

Hogue et al., 'NLSR: Named-data Link State Routing Protocol', Aug. 12, 2013, ICN 2013, pp. 15-20.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

L. Wang et al., 'OSPFN: An OSPF Based Routing Protocol for Named Data Networking,' Technical Report NDN-0003, 2012.

Merindol et al., "An efficient algorithm to enable path diversity in link state routing networks", Jan. 10, Computer Networks 55 (2011), pp. 1132-1140.

Soh et al., "Efficient Prefix Updates for IP Router Using Lexicographic Ordering and Updateable Address Set", Jan. 2008, IEEE Transactions on Computers, vol. 57, No. 1.

V. Jacobson et al., 'Networking Named Content,' Proc. IEEE CoNEXT '09, Dec. 2009.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Lynn$2E.

C. Gentry and A. Silverberg. Hierarchical ID-Based Cryptography. Advances in Cryptology—ASIACRYPT 2002. Springer Berlin Heidelberg (2002).

D. Boneh, C. Gentry, and B. Waters, 'Collusi.

D. Boneh and M. Franklin. Identity-Based Encryption from the Weil Pairing. Advances in Cryptology—CRYPTO 2001, vol. 2139, Springer Berlin Heidelberg (2001).

G. Ateniese, K. Fu, M. Green, and S. Hohenberger. Improved Proxy Reencryption Schemes with Applications to Secure Distributed Storage. In the 12th Annual Network and Distributed System Security Sympo.

H. Xiong, X. Zhang, W. Zhu, and D. Yao. CloudSeal: End-to$2.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digital Rights Management using Broadcast Encryption. Proceedings of the IEEE 92.6 (2004).

J. Shao and Z. Cao. CCA-Secure Proxy Re-Encryption without Pairings. Public Key Cryptography. Springer Lecture Notes in Computer Sciencevol. 5443 (2009).

M. Blaze, G. Bleumer, and M. Strauss, 'Divertible protocols and atomic prosy cryptography,' in Proc. EUROCRYPT 1998, Espoo, Finland, May-Jun. 1998, pp. 127-144.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/ pdf/rtmp specification 1.0.pdf.

(56) References Cited

OTHER PUBLICATIONS

S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/ Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: An architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network &oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.

(56) References Cited

OTHER PUBLICATIONS

Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S.Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.

(56) References Cited

OTHER PUBLICATIONS

T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, O. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014}: 66-73.
D. Trossen and G. Parisis, "Designing and realizing and information-centric internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Anteniese et al., "Improved Proxy Re-Encryption Schemes with Applications to Secure Distributed Storage", 2006.
Xiong et al., "CloudSeal: End-to-End Content Protection in Cloud-based Storage and Delivery Services", 2012.
"PBC Library-Pairing-Based Cryptography-About," http://crypto.stanford.edu/pbc. downloaded Apr. 27, 2015.
Boneh et al., "Collusion Resistant Broadcast Encryption With Short Ciphertexts and Private Keys", 2005.
Biradar et al., "Review of multicast routing mechanisms in mobile ad hoc networks", Aug. 16, Journal of Network and Computer Applications 35 (2012) 221-229.
Xie et al. "Collaborative Forwarding and Caching in Content Centric Networks", Networking 2012.

* cited by examiner

METHOD AND APPARATUS FOR PERFORMING SERVER HANDOFF IN A NAME-BASED CONTENT DISTRIBUTION SYSTEM

BACKGROUND

1. Field

This disclosure is generally related to performing data and service migration in a content delivery network. More specifically, this disclosure is related to using the content-centric network (CCN) architecture to perform server handoff.

2. Related Art

Hosted services are typically implemented using one or more servers that may be deployed as a hierarchical and distributed system that is designed to provide reliable and scalable access to a service. The servers may be broken down into a set of content servers that host the supported service or its underlying components, and a set of edge servers that each provides the service to a set of client devices or serve as a front end to clients to coordinate access and control. Oftentimes, a service may be deployed across multiple data centers that are distributed across a wide geographical region, for example, to minimize network latency to any client device. One such example of an available service is a Content Distribution Network (CDN).

Over time, it is typical for the request load to change across servers. An individual server may experience a heavy request load due to a spike in requests from a plurality of users, or due to an uneven placement of content across the edge servers. If the load becomes too heavy for a server or underlying service component, the server's response to a user's request can degrade significantly, which can quickly change a user's perceived performance of the service as a whole.

System administrators typically attempt to ensure that the service is reliable for all users by ensuring that no single edge server or service component becomes over utilized. This may require, for example, configuring the system to perform load balancing across the set of servers. The system administrator may also need to migrate data and/or functions between servers, such as when a given edge server has become over utilized.

Unfortunately, performing load balancing across edge servers is a complicated task that needs to be performed carefully to prevent interrupting service to a client device. Existing systems typically perform load balancing across servers by assigning each new client device request or service function to a particular server, and configuring the requesting device to communicate with the server to receive any other data packets for the current session.

However, this configuration requires the client device to continue communicating with the same server until the current session is complete, even if this server becomes over utilized. For example, when the CDN system copies content over to a new server, the CDN system configures some or all client devices to direct any new download requests to this new server. However, the CDN system may allow the ongoing requests to continue downloading their data streams from the previous server. This, of course, causes the previous server to remain overloaded until a sufficient number of clients have finished downloading their data streams, which forces these clients to continue experiencing performance thrashing for an extended time period after the new server has been brought on line.

SUMMARY

One embodiment provides a server-handoff system that facilitates performing load balancing and content migration on a set of content producers. During operation, the system can detect a data-handoff condition for replicating data to an alternative content producer (e.g., a server or a peer network device), and determines a namespace to replicate to the alternative content producer. The namespace that is to be migrated includes a data collection or a service associated with one or more structured name prefixes. The system then identifies the alternative content producer to which the namespace is to be replicated, and synchronizes a namespace configuration with the alternative content producer. The namespace configuration identifies a set of data items from the namespace which facilitates the alternative content producer to host the data or service.

In some embodiments, the system removes the data collection or service from a local content repository in response to determining that the alternative server has obtained the data items identified by the namespace configuration. Removing the data collection or service from the local content repository facilitates redirecting requests for the namespace to the alternative content producer.

In some embodiments, the system detects a data-handoff condition by determining that a network throughput is above a predetermined throughput threshold, determining that a data storage amount is above a predetermined storage threshold, determining that a processing load is above a predetermined CPU threshold and/or other alternative performance or metric. Further the system can detect the data-handoff condition by receiving a data-handoff command from a load-balancing agent (e.g., a server or a local application), and/or receiving a data-handoff command from a system administrator or other controller.

In some embodiments, the system determines the namespace to replicate by selecting a namespace from a set of namespaces being hosted by a local content repository, cache, or application. Further, the system can determine a namespace portion from the most-requested namespace, such that the namespace portion includes one or more structured name prefixes whose aggregate resource requirements are greater than a predetermined threshold.

In some embodiments, while identifying the alternative content producer, the system determines resource requirements associated with content objects of the namespace's data collection or publishing space, and identifies a set of alternative content producers. The system then selects, from the set of alternative content producers, a content producer that best satisfies the resource, performance, or availability requirements.

In some embodiments, the system can receive a plurality of content objects that are being migrated to a local content repository, cache, or application from a remote server. The system then updates routing information for the plurality of content objects, which facilitates other remote devices to obtain any of the plurality of content objects from the local content repository, cache, or application.

In some variations to these embodiments, the system advertises routing information by performing a content-centric networking synchronization (CCN SYNC) protocol with a neighboring network node to communicate routing and configuration information for a structured name prefix associated with the namespace being migrated. The configuration information can include one or more of: data stored in a data repository; data stored in a cache; a user session; a service; and an application configuration.

In some embodiments, the server-handoff system includes one or more of: a network edge server; a cache server; a storage server; a computer cluster; an application server; a sensor; a peer device; and an application.

BRIEF DESCRIPTION OF THE FIGURES

In the figures, like reference numerals refer to the same figure elements.

DETAILED DESCRIPTION

Figure 1:
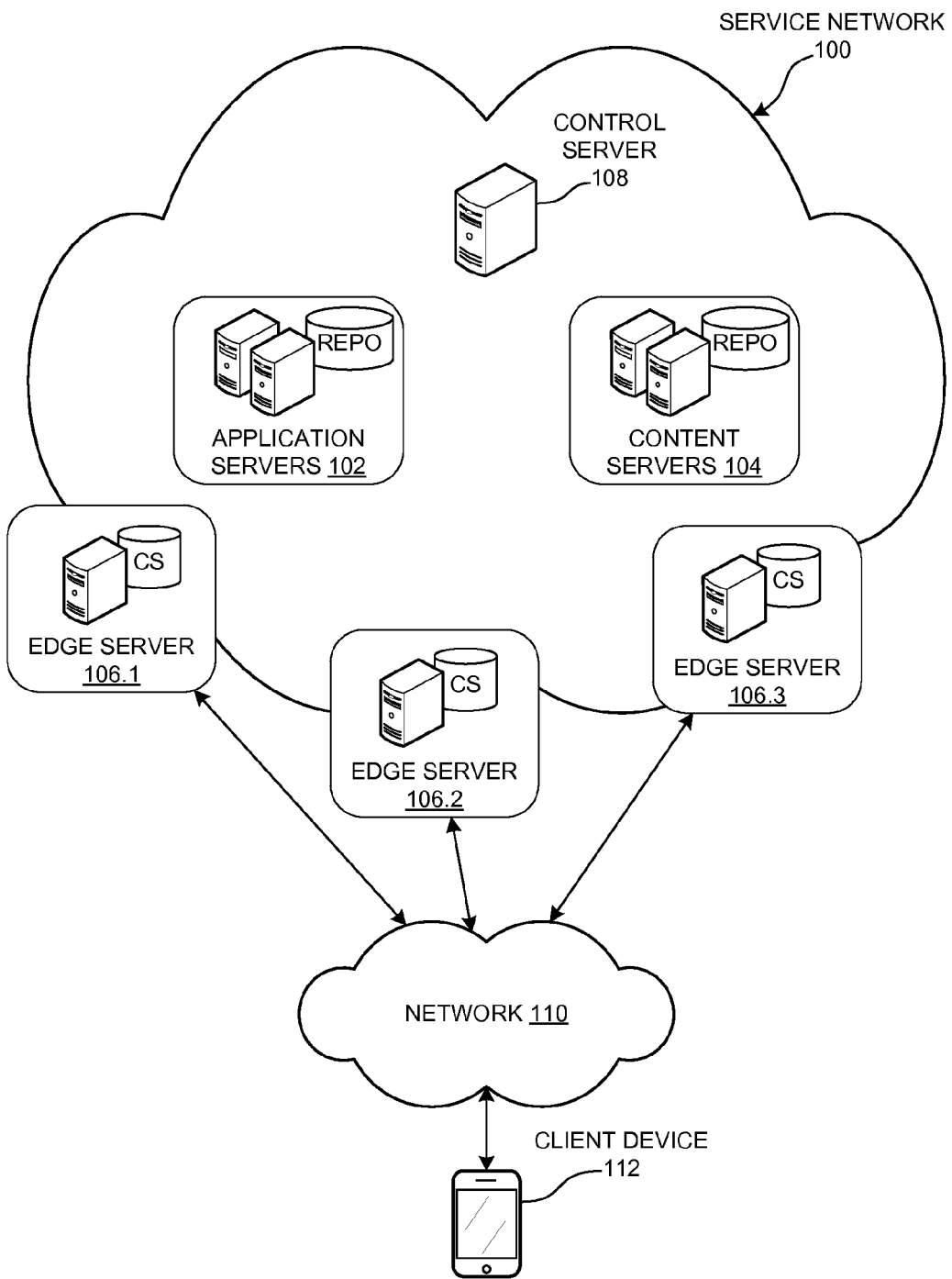
FIG. 1 illustrates an exemplary service network that uses CCN, a name-based networking architecture, to perform server handoff in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a server-handoff system that solves the problem of performing load balancing on a set of servers. Specifically, the server-handoff system can utilize a content-centric network (CCN) architecture to replicate a data collection or functionality to servers of a hosted service such as a content delivery network (CDN). The system also disseminates advertisements of routing information that configure the content-centric network to forward a client's interest to any of these servers, which seamlessly transitions clients, or portions of their requests, to the new servers or full complement of available servers.

In some embodiments, because the system uses a name-based architecture to request data from servers, the system can achieve a simplified server-handoff implementation that allows client device sessions to be moved among edge servers during an active download session, and also allows client devices to utilize multiple edge servers during the same session. This also allows a single client session to be easily and seamlessly distributed among the set of available servers. Hence, the system can achieve a fine-grained level of load balancing, where a client device's interests for a data stream can flow to any server that can satisfy the interest. As the data collection or service functionality is added to some new servers and/or removed from others, intermediate nodes and CCN routers will naturally spread out the client device's interests between the servers that are currently hosting the requested data or services. The system does not need to configure the client device to utilize the new servers, or to stop utilizing the old servers that no longer host the requested data or service.

When the system brings a new server online, the system may use CCN SYNC to configure the new server to cache or permanently store content under one or more specific namespaces, to disseminate control or configuration information, and configures the new server with route information to remote sources of the content or services. When using CCN SYNC, the new server stores its CCN SYNC configuration (slice), and fetches the data in the specified namespace using the route information to the remote sources. When the new server obtains the command to provide some or all the data or services in the namespace, the new server (or a control server) can advertise the presence of this data or functionality at the new server to allow routers to forward interests for this data to the new edge server. Client devices that have an active session may begin utilizing the new server without having to be reconfigured to direct their requests to the new server, they can continue using their existing server, or they can utilize both servers. These options are possible without implementing any changes to the client, without requiring any additional actions by the client, and without exposing the client to any perceived service configuration. The client request may also change between use of one, an alternate, or multiple servers. This system may route client requests to different servers on the client's behalf. This natural load-balancing ability is possible because the edge servers are configured to satisfy name-based requests for content (CCN interests), which does not require establishing location-based connections of typical computer networks (e.g., as in IP-based networks).

The CCN SYNC protocol is described in the following applications whose disclosures are incorporated by reference in their entirety herein: U.S. patent application Ser. No. 13/681,306, entitled "DATA TRANSPORT BY NAMED CONTENT SYNCHRONIZATION," by inventors Van L. Jacobson and Marc E. Mosko, filed 19 Nov. 2012; and U.S. patent application Ser. No. 13/720,736, entitled "DYNAMIC ROUTING PROTOCOLS USING DATABASE SYNCHRONIZATION," by inventors Van L. Jacobson and Marc E. Mosko, filed 19 Dec. 2012.

FIG. 1 illustrates an exemplary service network 100 that uses CCN, a name-based networking architecture, to perform server handoff in accordance with an embodiment. Specifically, an exemplary service network 100 can include a set of application servers 102 which store an application that is accessible by a plurality of users, and also includes a set of content servers 104 that store the application's content. Application servers 102 can include, for example, a web server, a database server, or any other server that provides access to the application or its services.

Content servers 104 can include or be coupled to any data repository or responding application that stores or produces data objects referenced by the application or its services. These data objects can include supporting data objects for the application, such as image files, audio streams, video streams, animations, application control or any other data objects that that are to be presented to a user. The data repository can also store any other data objects that are to be accessed by a user's client device, such as a document, a binary executable file, a compressed archive (e.g., a zip file), application context, etc.

Service network 100 can also include a set of edge servers 106 that handle requests from various client devices, and a control server 108 that controls which content objects are to be proactively cached or stored by each edge server. For example, control server 108 can configure edge servers 106.1 and 106.2 to each host a different slice (subset) of the content hosted by content servers 104. This configuration allows the requests from a plurality of users to be distributed across edge servers 106.

Control server 108 can implement a higher level control and coordination for service network 100 to connect (potentially through an overlay) CCN components to allow interests to be routed through the network of nodes. When an edge server 106 obtains a new content object to host, control server 108 (or the edge server itself) disseminates any necessary routing configuration changes for the edge server across a plurality of CCN routers of service network 100 and CCN 110. This routing configuration can indicate a namespace being advertised, and network information for the edge server that the CCN routers can use to forward interests that match the namespace to the edge server. The advertised namespace can include the content object's structured name, or a structured name prefix for the content object. The CCN routers that receive the advertised namespace can store the routing configuration in a forwarding information base (FIB), in association with the advertised namespace. This allows the routers to use this routing configuration to forward any interest matching the namespace toward an edge server whose assigned namespace includes the corresponding content object.

A client device 112 can disseminate interests for accessing the service, or for accessing data objects associated with the service. For example, client device 112 may be coupled to a network 110, such as a content centric network, that includes a plurality of routers or network nodes that forward the interest toward the exemplary service network 100. However, if client device 112 or network 110 does not include a CCN-capable device, client device 112 can send a request to an intermediary server of service network 100 (e.g., control server 108) over an Internet protocol (IP) network, and this intermediary server disseminates an interest on behalf of client device 112.

In some embodiments, control server 108 can receive and process interests or requests for control-related operations. The control-related operations can include, for example, a request to sign into a web service, a request to post data to the web service (e.g., posting information to one or more data fields), a request to complete a financial transaction (e.g., make a payment), or a request to obtain or post any other service-related operation. Once control server 108 processes the interest or request, control server 108 can transition the request to an edge server that is to complete the fulfillment.

For example, edge server 106.1 may store a set of movies whose title's first letter is in the set {'A,' . . . 'M'}, and edge server 106.2 may store a set of movies whose title's first letter is in the set {'N,' . . . 'Z'}. Hence, the CCN routers in service network 100 may include FIB entries that map interests for movies in the set {'A,' . . . 'M'} (e.g., "/PARC/Movies/A/", . . . "/PARC/Movies/M/") to routing configuration data for edge server 106.1. Similarly, these CCN routers may also include FIB entries that map interests for movies in the set {'N,' . . . 'Z'} to routing configuration data for edge server 106.2. This way, when control server 108 receives an interest or a request for a movie "Peter Pan," control server 108 can generate an interest ("/PARC/Movies/P/Peter Pan/") for the movie on behalf of the client, and forwards the interest across service network 100. The routers of service network 100 then use the corresponding FIB entries to forward the interest toward edge server 106.2.

In some embodiments, edge servers 106 may store large data streams as collections of content objects. Hence, once control server 108 grants client device 112 access to the movie stream, the content returned by edge server 106.2 can be accessed by client device 112. Client device 112 can obtain the remainder of the movie stream by disseminating a plurality of interests for the collection in a predetermined sequence. These interests may be transmitted to and satisfied by one or more of the service nodes 102, 104, and 106. Client device 112 could also obtain the protected content ahead of time (such as before turning off network connectivity on a trip) through the use of multiple parallelized interests to one or more servers, so that the content can be hosted locally at a later time by a CCN repository local to client device 112.

Over time, it is possible that edge server 106.2 may become overloaded with requests, such as when a much anticipated "Star Trek" movie becomes available for rent or purchase online. To alleviate the load on edge server 106.2, control server 108 can bring a new edge server 106.3 online, and can replicate at least a portion of the namespace from edge server 106.2 onto edge server 106.3. This way, a subset of interests that would have been forwarded to edge server 106.2 can now be forwarded to edge server 106.3 instead. If client device 112 is in the process of streaming "Peter Pan" when the namespace subset is replicated on edge server 106.3, it is possible for some or all of the interests from client device 112 to flow toward edge server 106.3 without explicitly reconfiguring the streaming session for client device 112. Additionally, the server acting as a coordination point for streaming "Peter Pan" may use local heuristics to decide not to cache the stream and instead depend on an alternate in-network or client side cache. If storing "Peter Pan" locally would help system performance overall, this may trigger the server to cache the content and update system routing information. This action may be of particular interest as a video gains epidemic popularity.

Figure 2A:
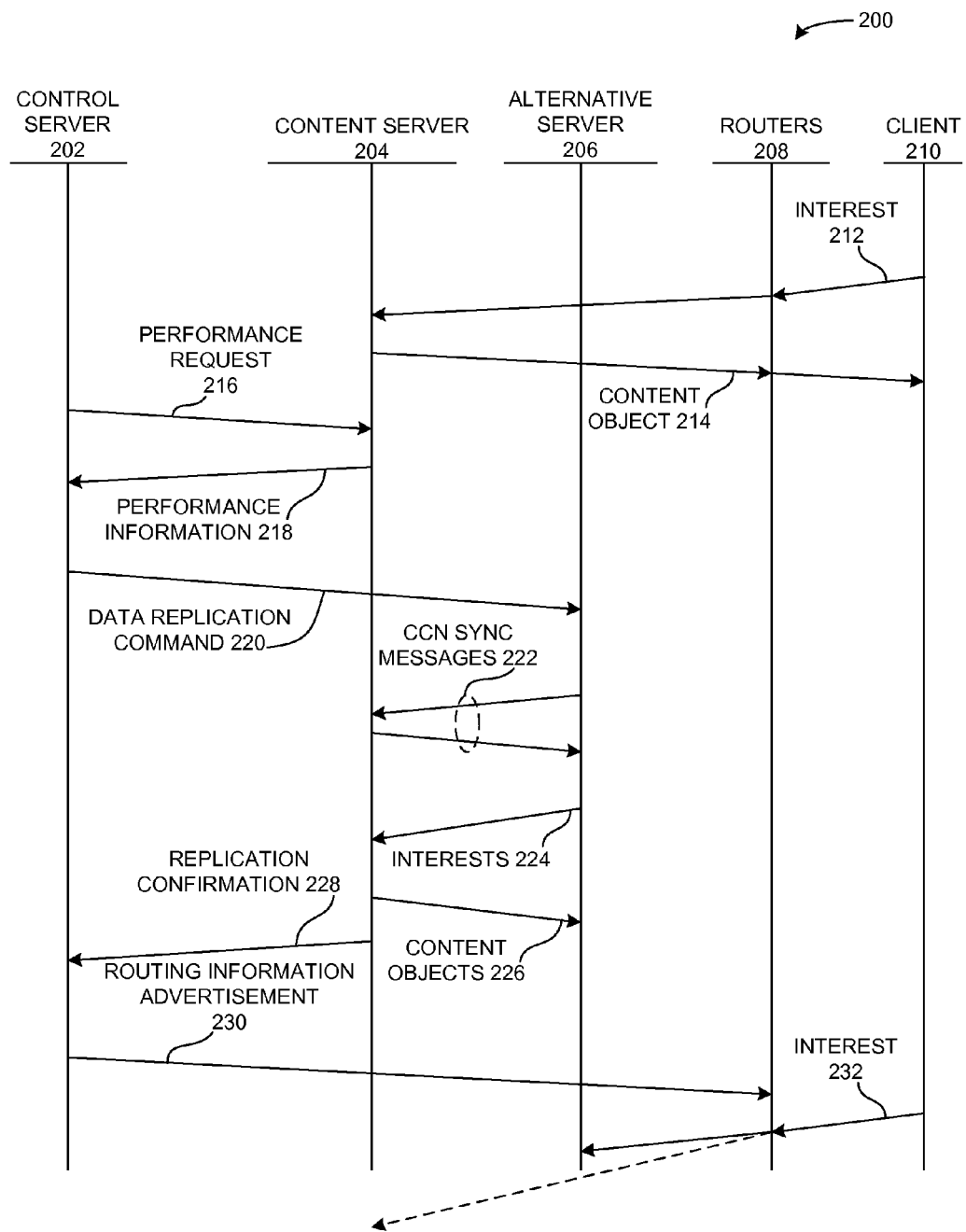
FIG. 2A illustrates exemplary communications between server computers that perform server handoff in response to receiving a command from a control server or application in accordance with an embodiment.

FIG. 2A illustrates exemplary communications 200 between server computers that perform server handoff in response to receiving a command from a control server 202 in accordance with an embodiment. During operation, a CDN content server 204 can provide a large file, such as a movie stream, to a plurality of client devices by processing interests that each indicate a request for a portion of the file or stream. Specifically, content server 204 may store the file or stream as a collection of content objects, and each interest may include a structured name for a particular content object. This allows each client device to disseminate interests as fast or slow as their network or processing abilities allow.

Client device 210 can obtain the file during a download session with the CDN by disseminating an interest 212 for a content object in the collection, and one or more CCN routers 208 can forward interest 212 to content server 204. Content server 204 processes the interest to identify a content object 214 that satisfies interest 212, and returns content object 214 to routers 208. Routers 208 then forward content object 214 to an interface through which they received interest 212, and content object 214 eventually reaches client device 210. If content server 204 is over utilized, content server 204 may take an undesirable long period of time to process interest 212, which can be frustrating to a user that is waiting to access an online service or to download content. In some embodiments, a control server 202 can replicate or migrate a namespace portion from content server 204 to an alternative server 206, and can configure CCN routers to distribute a plurality of interests between servers 204 and 206.

For example, control server 202 can send a performance request 216 to content server 204, and content server 204 returns performance-related information to control server 202. Performance information 218 can include a plurality of performance attributes that characterizes the load on content server 204, such as a number of requests or interests served per second, a latency response time for responding to each request or interest, a data throughput, a request or interest queue length, etc. Performance information 218 can also include other information that indicates whether content server 204 is over utilized, such as an amount or a percentage of storage space available to store new content.

If control server 202 determines that one or more of the performance attributes are performing below a desired threshold, control server 202 can send a data replication command 220 to alternative server 206. Data replication command 220 can indicate one or more namespaces to replicate, and control server 202 can also send data replication command 220 to any other alternative servers that are to receive and host data collections associated with these namespaces. Data replication command 220, for example, can indicate that alternative server 206 is to replicate a data collection for the namespace "/PARC/Movies/" from content server 204. Alternative server 206 can then initiate a CCN SYNC message exchange 222 with content server 204, which causes alternative server 206 to obtain (via a synchronization protocol) a SYNC configuration for collection "/PARC/Movies" from content server 204.

Alternative server 206 then determines which of the content objects from the index are not stored locally, and disseminates interests 224 for these content objects over the content centric network (as per the SYNC protocol). In some embodiments, some or all of interests 224 can flow to content server 204, and content server 204 returns content objects 226 that satisfy these interests to alternative server 206. At this point, alternative server 206 has a replicated copy of the namespace "/PARC/Movies/," and can process content objects for this namespace to return the appropriate content. However, in order for interests to flow to alternative server 206, either control server 202 or alternative server 206 need to disseminate a routing information advertisement 230 that indicates the presence of the namespace at alternative server 206.

Routers 208 can use routing information advertisement 230 to update a local forwarding information base (FIB) that indicates how to forward interests associated with this namespace toward alternative server 206. Then, as client device 210 disseminates another interest 232 during the download session, routers 208 can forward interest 232 to either alternative server 206 or content server 204. For example, some CCN router may determine two or more possible links that can be used to forward interest 232, and selects a link with the best network performance. This can result in interest 232 being load balanced between content server 204 and alternative server 206. While this example describes a content distribution system that hosts pre-published content, the system can also function as a dynamic service that creates content on the fly.

In some embodiments, a content server can initiate a data replication or migration operation with an alternative server to relieve a load on the local content server. This allows the content server to adjust which namespaces are replicated, without requiring a control server to initiate the data-replication process.

Figure 2B:
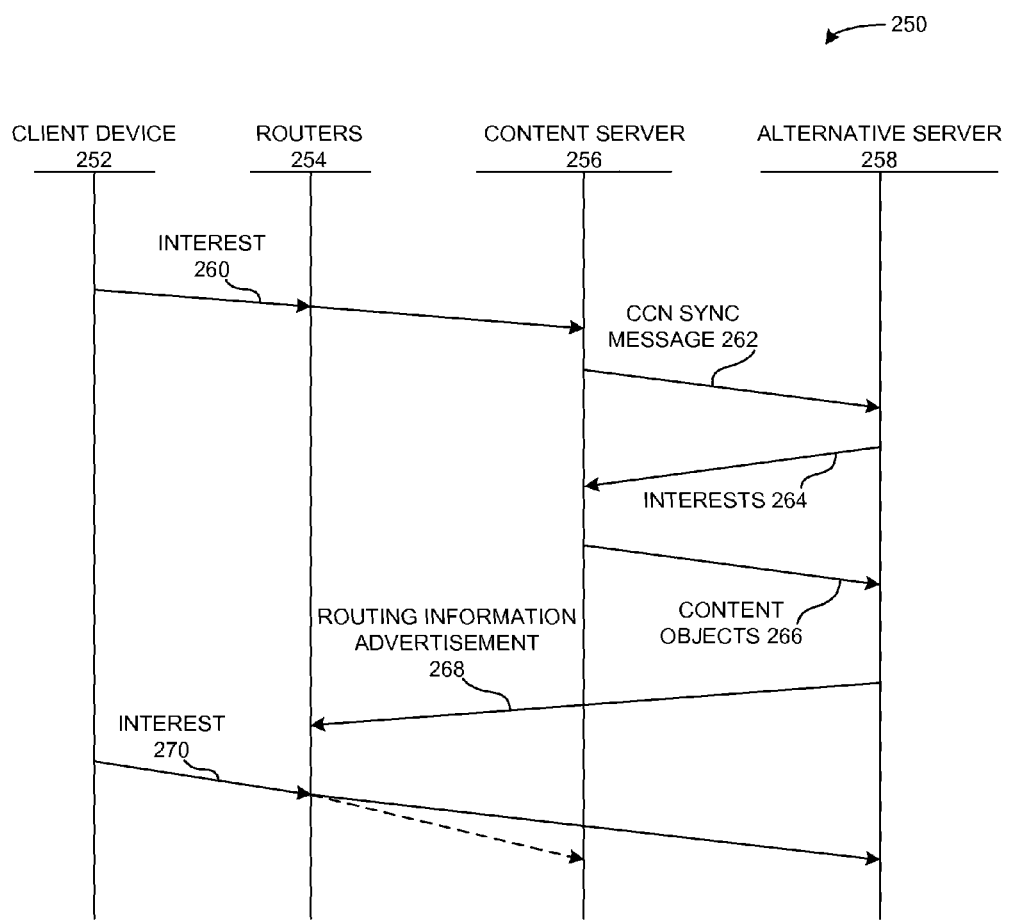
FIG. 2B illustrates exemplary communications between server computers that perform server handoff in response to receiving an interest or a content object from a client device in accordance with an embodiment.

FIG. 2B illustrates exemplary communications 250 between server computers that perform server handoff in response to receiving an interest or a content object from a client device in accordance with an embodiment. During a download session with a CDN, a client device 252 can disseminate an interest 260, and CCN routers 254 can forward interest 260 to a content server 256 of the CDN.

In some embodiments, if content server 256 determines that it has become overloaded with requests, content server 256 can offload a portion of a namespace by selecting an alternative server 258 from a list of possible replication servers. Content server 256 can then send a CCN SYNC message 262 to alternative server 258, which initiates the CCN SYNC protocol to synchronize the namespace portion between content server 256 and alternative server 258. Once alternative server 258 has synchronized the SYNC configuration for this namespace portion, alternative server 258 can disseminate interests 264 to obtain content objects 266 in the namespace portion that are not already stored within a local repository or cache.

Alternative server 258 then disseminates a routing information advertisement 268 that indicates the presence of the replicated data collection at alternative server 258. Routers 254 can update a local forwarding information base (FIB) based on routing information advertisement 268 to associate a structured name of the namespace with a link that reaches alternative server 258. Then, when client device 252 disseminates another interest 270 during the download session, routers 254 can forward interest 270 to either alternative server 258 or content server 256. Hence, content server 256 can improve the performance of a download session from client device 252 by replicating a data collection to alternative server 258 and causing load balancing at router 254 between content server 204 and alternative server 206, without having to reconfigure the active session with client device 252.

Figure 3:
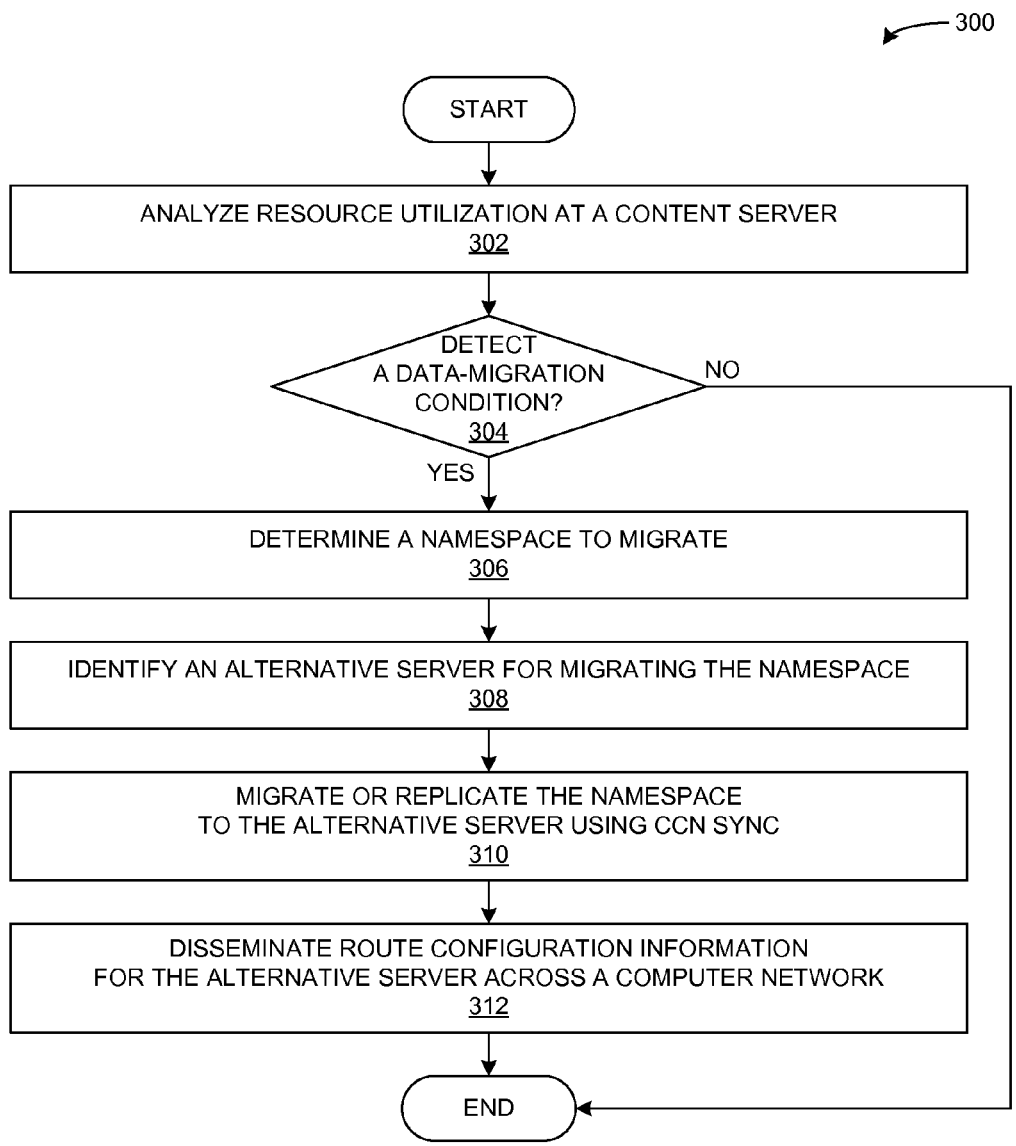
FIG. 3 presents a flow chart illustrating a method for performing server handoff in accordance with an embodiment.

FIG. 3 presents a flow chart illustrating a method 300 for performing server handoff in accordance with an embodiment. During operation, the system can analyze resource utilization at a content server of the CDN (operation 302), such as at a local server computer. In some embodiments, the system may include a load-balancing controller that monitors resource utilization for a plurality of servers to reconfigure the namespace portions that are to be handled by each server.

The system then determines whether it detects a data-migration or replication condition (operation 304). For example, the content server can monitor a set of resources, such as a data repository, system memory (e.g., random access memory (RAM)), a network bandwidth, etc. The system may analyze these resources to determine whether any of these resources are being over utilized (e.g., utilized above a predetermined threshold). As another example, the system may include an edge server that obtains a command from a load-balancing controller that instructs the server to replicate or migrate a namespace to an alternative edge server.

If a data-migration condition is detected, the system determines a structured name prefix to migrate (operation 306), and identifies an alternative server for migrating the structured name prefix (operation 308). The system may then utilize CCN SYNC to migrate or replicate the structured name prefix to the alternative server (operation 310). The system can also disseminate routing and configuration information for the alternative server across a computer network (operation 312). In some embodiments, the alternative server can disseminate the route configuration information itself. In some other embodiments, the load-balancing controller can disseminate the route configuration information for the alternative server.

Figure 4:
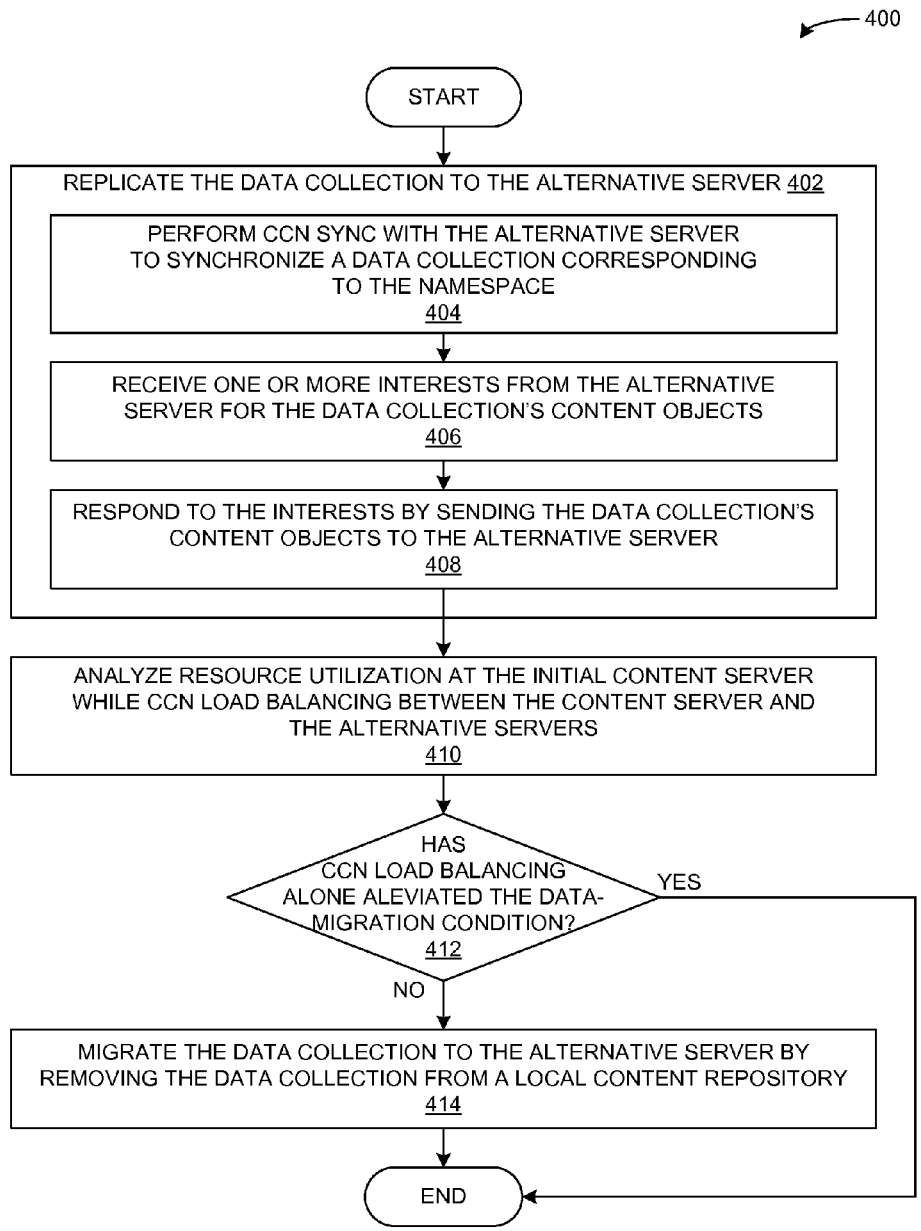
FIG. 4 presents a flow chart illustrating a method for using CCN to migrate or replicate a structured name prefix to an alternative server in accordance with an embodiment.

FIG. 4 presents a flow chart illustrating a method 400 for using CCN to migrate or replicate a structured name prefix to an alternative server in accordance with an embodiment. During operation, the system can use CCN to replicate the data collection to the alternative server (operation 402). For example, while replicating the data collection, the system can perform CCN SYNC with the alternative server to synchronize the data collection (operation 404). Note that in some embodiments, CCN SYNC synchronizes a listing of content objects stored on a local repository and a remote repository, without transferring the content objects themselves. Hence, the system can receive one or more interests from the alternative server for the data collection of content objects (operation 406), and responds to the interests by sending the content objects to the alternative server (operation 408).

Once the data collection's content objects are replicated at the alternative server and the route configuration information is disseminated across the computer network, the CCN routers will naturally perform load balancing between the local server and the alternative server. For example, when multiple alternative CCN servers can satisfy interests for a given namespace, one or more CCN routers may include a forwarding information base (FIB) entry that maps the namespace to multiple outgoing interfaces. Each of these output interfaces corresponds to a different alternative CCN node, and these routers may select one of the outgoing interfaces randomly or based on performance metrics for each interface. This causes the output port selected by these routers to vary over time for a given namespace, which in turn results in a probabilistic distribution for how interests for this namespace are forwarded across the network. The interests may also be distributed to the alternative, or additional, server prior to start or completion of the content or service replication. The two processes may be done in parallel to speed the transition to the new operating configuration.

Thus, when client devices disseminate interests for the replicated namespace, the probabilistic nature of how CCN routers select forwarding information for these interests achieves load balancing on the replicated namespace. These CCN routers effectively forward some interests to the initial content server, and forward other interests to the alternative server. However, redirecting a portion of the interests to the alternative server may not always reduce the content server's resource utilization enough to alleviate a data-migration condition.

In some embodiments, the system can further reduce the content server's resource utilization by removing the replicated namespace from the content server altogether. For example, the system can analyze the resource utilization at the content server while the routers are performing CCN load balancing on the replicated namespace (operation 410), and determine whether CCN load balancing alone has alleviated the data-migration condition (operation 412). If the data-migration condition still holds, the system can remove the data collection from a local content repository (operation 414), which effectively migrates the data collection to the alternative network node.

Figure 5:
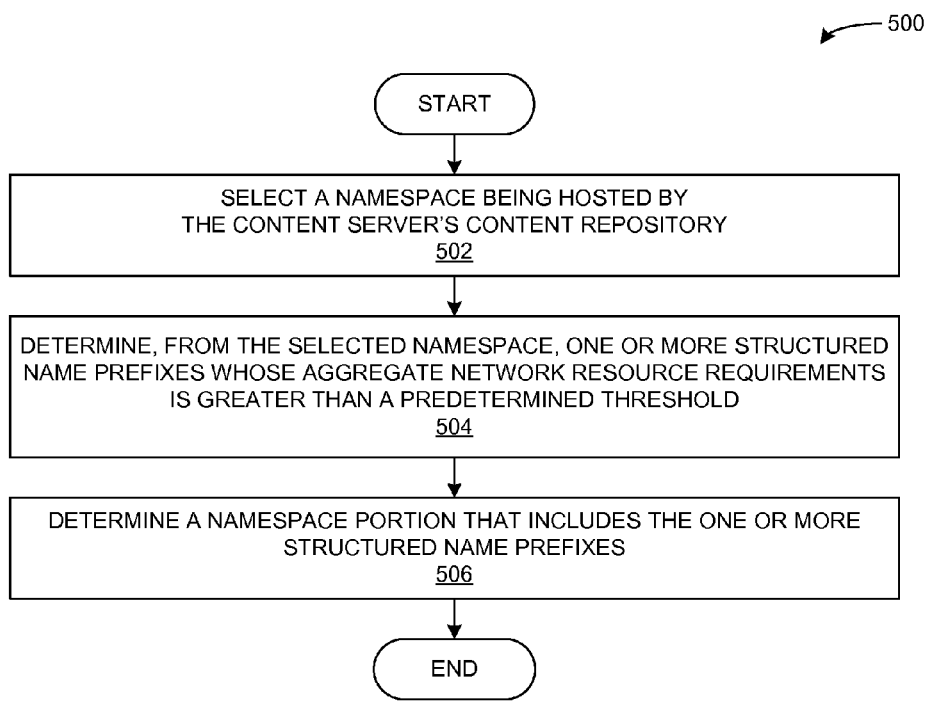
FIG. 5 presents a flow chart illustrating a method for determining a namespace portion to hand off to an alternative server of the exemplary content distribution service in accordance with an embodiment.

FIG. 5 presents a flow chart illustrating a method 500 for determining a namespace portion to hand off to an alternative server of the exemplary content distribution service in accordance with an embodiment. During operation, the system selects a namespace being hosted by the content server's content repository (operation 502). The system can select the namespace, for example, from an interest or content object that was recently received at the content server, and that may have caused the custom server's resource utilization to grow above a predetermined threshold. Alternatively, the system can receive a command from a control server that instructs the system to migrate or replicate a namespace, and indicates a list of candidate namespaces for the system to choose from.

This namespace can include one or more structured name prefixes that make up a data collection. Each structured name prefix may correspond to a content category (e.g., "/PARC/Streaming/Videos/"), or may correspond to a specific file or data stream (e.g., "/PARC/Streaming/Videos/Spiderman"). Also, some structured name prefixes may require more resources than others, as the system may receive more interests for some structured name prefixes than others, and as some files or streams may require more network bandwidth than others. Content may also be listed or linked by multiple names.

The system can then determine a most-requested namespace portion whose aggregate network-resource requirements are greater than a predetermined threshold (operation 504), and determines the one or more structured names or structured name prefixes that correspond to the most-requested namespace portion (operation 506). For example, the system can iteratively select a structured name prefix that consumes the most resources, until the set of selected structured name prefixes has an aggregate resource consumption that is at least equal to an amount required to relieve the content server's data-migration condition.

Figure 6:
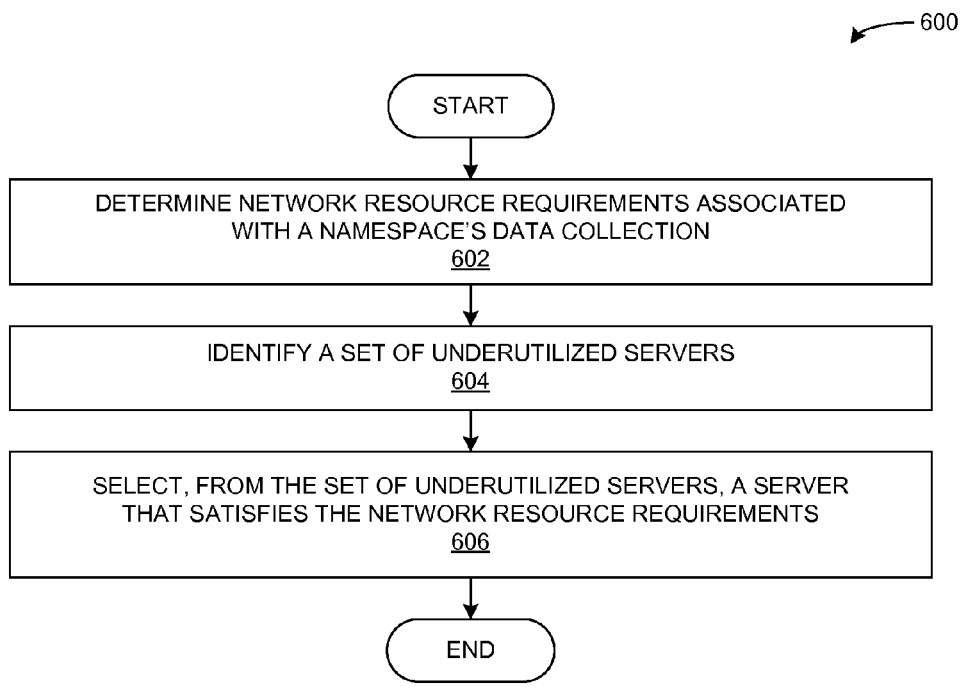
FIG. 6 presents a flow chart illustrating a method for selecting an alternative server as a target for migrating a namespace in accordance with an embodiment.

FIG. 6 presents a flow chart illustrating a method 600 for selecting an alternative server as a target for migrating a namespace in accordance with an embodiment. During operation, the system determines network resource requirements associated with a namespace's data collection (operation 602). These resource requirements can include a storage size for the namespace's data collection, a minimum network bandwidth required to receive and respond to all interests for the namespace, etc. The system then identifies a set of underutilized servers or identifies new server instances that will be started (operation 604), and selects at least one server that satisfies the network resource requirements (operation 606).

Performing Server Handoff During an Active User Session

In some embodiments, a server can maintain session information for a client device. For example, an edge server for a movie-streaming service can store session information that indicates account information for a user, capabilities of the user's client device, and performance-related information for the client device's connection to the streaming service. The capabilities may include audio and video formats supported by the client device, an audio and a video format selected by the user for the current session, a closed-captioning setting for the current session, and any other capabilities or settings for consuming content.

During an active user session, the edge server can use the session information to generate, filter, or transcode content for the user. For example, the movie-streaming edge server may deliver a regular-definition movie to a client device whose capabilities do not indicate a high-definition video format, or whose performance-related information indicates that the client device does not have a sufficiently high bandwidth to receive the movie in a high-definition format.

If a data collection is migrated to another edge server, the initial edge server can optionally perform CCN SYNC to migrate the data collection as well as session information for client devices that are currently accessing the data collection. This can be achieved by either including the session information within the data collection's namespace, or by performing CCN SYNC on both the data collection's namespace and a namespace for the session information.

Hence, when the data collection is migrated to one or more alternative edge servers, the client device can continue to disseminate interests for the same user session, with the only difference being that the interests can now be processed, potentially in parallel, by the alternative edge servers. These alternative edge servers can process interests based on the configuration of the client device's current user session or from information in the service namespace. An alternative edge server for the movie-streaming service can, for example, take over streaming a movie to a client device based on the same streaming settings configured by another server. The alternative server does not need to redo a slow-start of the movie stream to determine the client device's bandwidth and playback capabilities. Additionally, if common client device requirements can be clustered, the server can transcode the movie stream once for multiple requesting clients.

Figure 7:
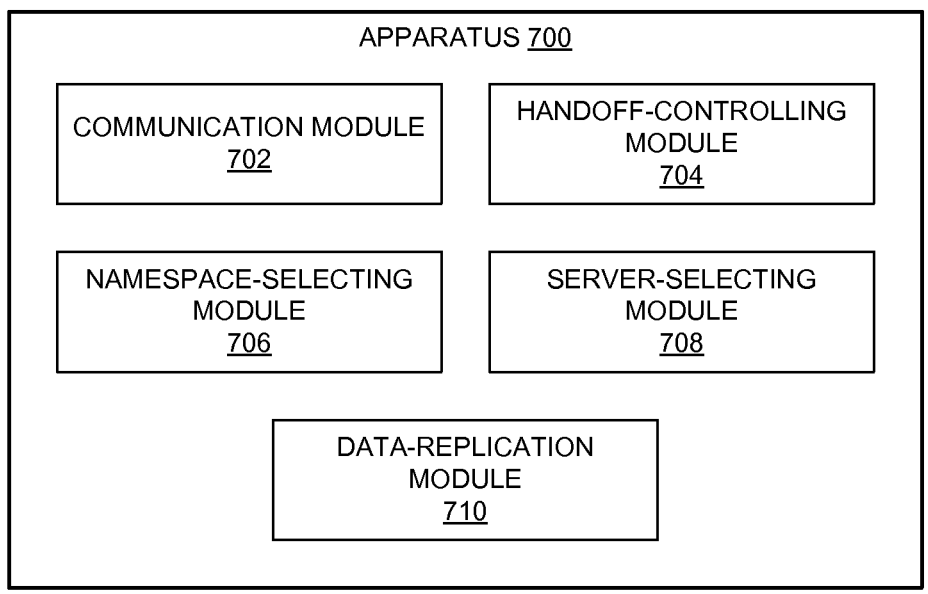
FIG. 7 illustrates an exemplary apparatus that facilitates using CCN to perform server handoff in a name-based content delivery system in accordance with an embodiment.

FIG. 7 illustrates an exemplary apparatus 700 that facilitates using CCN to perform server handoff in a name-based content delivery system in accordance with an embodiment. Apparatus 700 can comprise a plurality of modules that may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device that is capable of communicating with other computer systems and/or devices. Specifically, apparatus 700 can comprise a communication module 702, a handoff-controlling module 704, a namespace-selecting module 706, a server-selecting module 708, and a data-replication module 710.

In some embodiments, communication module 702 can communicate with network nodes across a content centric network, such as to receive an interest, to send a content object to a remote network node, and to synchronize a data collection with a remote network node. Handoff-controlling module 704 can detect a data-migration or replication condition for migrating data and/or services to an alternative server of a computer network. Namespace-selecting module 706 can determine a namespace to migrate to the alternative server. The namespace can include a data collection associated with at least one structured name prefix.

Server-selecting module 708 can identify the alternative server to which the namespace is to be migrated. Data-replication module 710 can migrate or replicate the namespace to the alternative server by synchronizing the data collection corresponding to the namespace with the alternative server.

Figure 8:
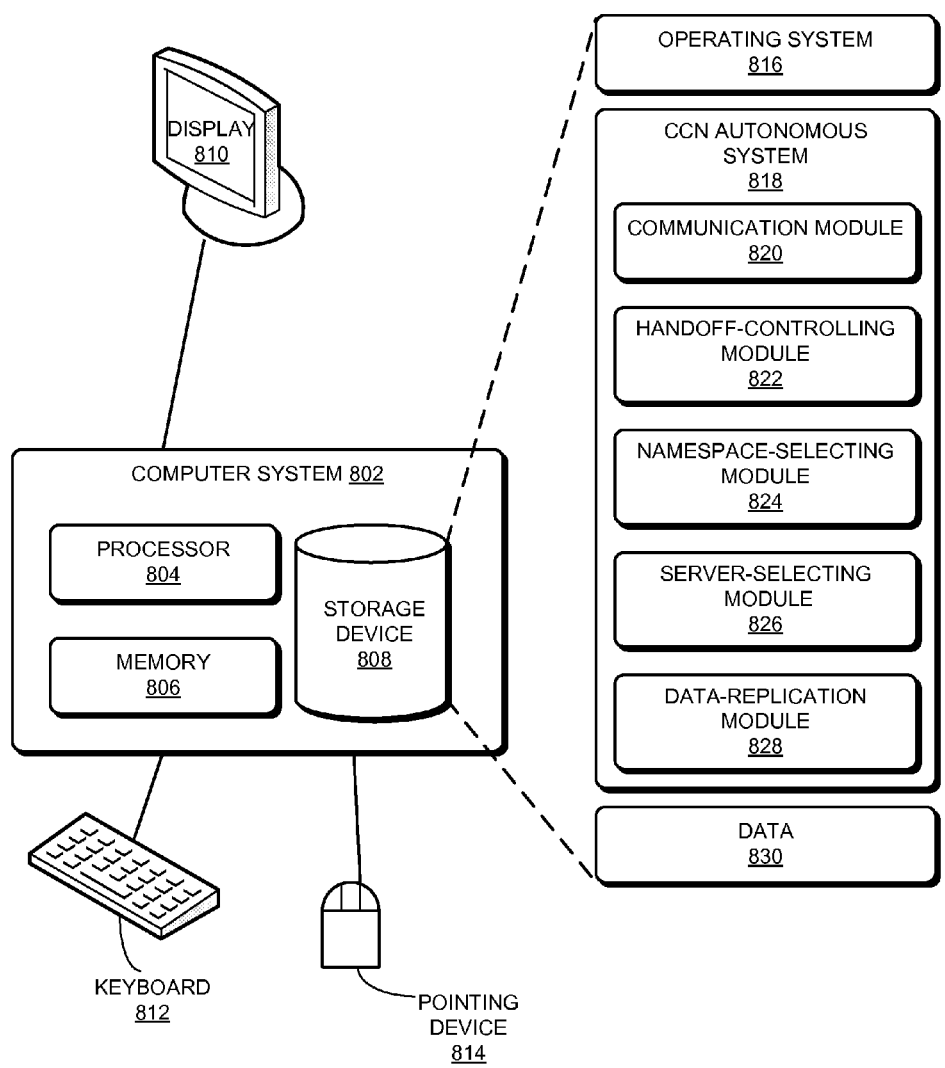
FIG. 8 illustrates an exemplary computer system that facilitates using CCN to perform server handoff in a name-based content delivery system in accordance with an embodiment.

FIG. 8 illustrates an exemplary computer system 802 that facilitates using CCN SYNC to perform server handoff in a name-based content delivery system in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, a server-handoff system 818, and data 826.

Server-handoff system 818 can include instructions, which when executed by computer system 802, can cause computer system 802 to perform methods and/or processes described in this disclosure. Specifically, server-handoff system 818 may include instructions for communicating with network nodes across a content centric network, such as to receive an interest, to send a content object to a remote network node, and to synchronize a data collection with a remote network node (communication module 820). Further, server-handoff system 818 can include instructions for detecting a data-migration or replication condition for migrating data and/or services to an alternative server of a computer network (handoff-controlling module 822). Server-handoff system 818 can also include instructions for determining a namespace to migrate to the alternative server (namespace-selecting module 824).

Server-handoff system 818 can include instructions for identifying the alternative server to which the namespace is to be migrated (server-selecting module 826). Server-handoff system 818 can also include instructions for migrating or replicating the namespace to the alternative server by synchronizing the data collection or service functionality corresponding to the namespace with the alternative server (data-replication module 828).

Data 830 can include any data that is required as input or that is generated as output by the methods and/or processes described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    detecting, by a content-producing computing device, a data-handoff condition for replicating data or a service to a first alternative content producer;
    determining a namespace to replicate to the first alternative content producer, wherein the namespace includes a data collection associated with at least one structured name prefix;
    identifying the first alternative content producer to which the namespace is to be replicated;
    synchronizing a namespace configuration with the first alternative content producer, wherein the namespace configuration identifies a set of data items from the namespace which facilitates the first alternative content producer to host the data or service; and
    in response to the content-producing computing device being identified as a second alternative content producer by a remote content producer, advertising, by the content-producing computing device, routing information for a content object received from the remote content producer, wherein the content object is migrated from the remote content producer, and wherein the routing information enables a remote device to obtain the received content object from the content-producing computing device.

2. The method of claim 1, further comprising:
responsive to determining that the first alternative content producer has obtained the data items identified by the namespace configuration, removing the data collection from a local content repository to redirect requests for the namespace to the first alternative content producer.

3. The method of claim 1, wherein the data-handoff condition includes one or more of:
determining that a network throughput is above a predetermined throughput threshold;
determining that a data storage amount is above a predetermined storage threshold;
determining that a processor load is above a predetermined threshold;
determining that a volatile memory usage is above a predetermined threshold;
determining that a data-request volume is above a predetermined threshold;
receiving a data-handoff command from a load-balancing agent; and
receiving a data-handoff command from a system administrator.

4. The method of claim 1, wherein determining the namespace to migrate involves:
selecting a namespace from a set of namespaces being hosted by a local content repository, cache, or application; and
determining, from the selected namespace, a namespace portion that includes one or more structured name prefixes whose aggregate resource requirements are greater than a predetermined threshold.

5. The method of claim 1, wherein identifying the first alternative content producer involves:
determining resource requirements associated with content objects of the namespace's data collection;
identifying a set of alternative content producers; and
selecting, from the set of alternative content producers, a content producer that satisfies the resource requirements.

6. The method of claim 1, wherein in response to the content-producing computing device being identified as the second alternative content producer by the remote content producer, the method further comprises:
receiving, by the content-producing computing device, a plurality of content objects which are being migrated to a local cache, application, or content repository from the remote content producer; and
wherein advertising the routing information further enables an intermediate node to update routing information for the plurality of content objects, which facilitates the remote device and other remote devices to obtain any of the plurality of content objects from the local cache, application, or content repository.

7. The method of claim 6, wherein synchronizing the data collection involves using a content centric network (CCN) SYNC protocol to synchronize one or more of:
a routing configuration;
data stored in a data repository;
data stored in a cache;
a user session;
a service; and
an application configuration.

8. The method of claim 1, wherein the content producer includes one or more of:
a network edge server;
a cache server;
a storage server;
a computer cluster;
an application server;
a sensor;
a peer device; and
an application.

9. A non-transitory computer-readable storage medium storing instructions that when executed by a computer cause the computer to perform a method, the method comprising:
detecting a data-handoff condition for replicating data or a service to a first alternative content producer;
determining a namespace to replicate to the first alternative content producer, wherein the namespace includes a data collection associated with at least one structured name prefix;
identifying the first alternative content producer to which the namespace is to be replicated;
synchronizing a namespace configuration with the first alternative content producer, wherein the namespace configuration identifies a set of data items from the namespace which facilitates the first alternative content producer to host the data or service; and
in response to the computer being identified as a second alternative content producer by a remote content producer, advertising, by the computer, routing information for a content object received from the remote content producer, wherein the content object is migrated from the remote content producer, and wherein the routing information enables a remote device to obtain the received content object from the computer.

10. The storage medium of claim 9, wherein the method further comprises:
responsive to determining that the first alternative content producer has obtained the data items identified by the namespace configuration, removing the data collection from a local content repository to redirect requests for the namespace to the first alternative content producer.

11. The storage medium of claim 9, wherein the data-handoff condition includes one or more of:
determining that a network throughput is above a predetermined throughput threshold;
determining that a data storage amount is above a predetermined storage threshold;
determining that a processor load is above a predetermined threshold;
determining that a volatile memory usage is above a predetermined threshold;
determining that a data-request volume is above a predetermined threshold;
receiving a data-handoff command from a load-balancing agent; and
receiving a data-handoff command from a system administrator.

12. The storage medium of claim 9, wherein determining the namespace to replicate involves:
selecting a namespace from a set of namespaces being hosted by a local content repository, cache, or application; and
determining, from the selected namespace, a namespace portion that includes one or more structured name prefixes whose aggregate resource requirements are greater than a predetermined threshold.

13. The storage medium of claim 9, wherein identifying the first alternative content producer involves:
   determining resource requirements associated with content objects of the namespace's data collection;
   identifying a set of alternative content producers; and
   selecting, from the set of alternative content producers, a content producer that satisfies the resource requirements.

14. The storage medium of claim 9, wherein in response to the computer being identified as the second alternative content producer by the remote content producer, the method further comprises:
   receiving, by the computer, a plurality of content objects which are being migrated to a local cache, application, or content repository from the remote content producer; and
   wherein advertising the routing information further enables an intermediate node to update routing information for the plurality of content objects, which facilitates the remote device and other remote devices to obtain any of the plurality of content objects from the local cache, application, or content repository.

15. The storage medium of claim 14, wherein synchronizing the data collection involves using a content centric network (CCN) SYNC protocol to synchronize one or more of:
   a routing configuration;
   data stored in a data repository;
   data stored in a cache;
   a user session;
   a service; and
   an application configuration.

16. The storage medium of claim 9, wherein the computer includes one or more of:
   a network edge server;
   a cache server;
   a storage server;
   a computer cluster;
   an application server;
   a sensor;
   a peer device; and
   an application.

17. A computer system for facilitating server handoff in a name-based content centric network, the system comprising:
   a processor; and
   a memory coupled to the processor and storing instructions, which when executed by the processor cause the processor to perform a method, the method comprising:
   detecting, by the computer system, a data-handoff condition for replicating data or a service to a first alternative content producer;
   determining a namespace to replicate to the first alternative content producer, wherein the namespace includes a data collection associated with at least one structured name prefix;
   identifying the first alternative content producer to which the namespace is to be replicated;
   synchronizing a namespace configuration with the first alternative content producer, wherein the namespace configuration identifies a set of data items from the namespace which facilitates the first alternative content producer to host the data or service; and
   in response to the computer system being identified as a second alternative content producer by a remote content producer, advertising, by the computer system, routing information for a content object received from the remote content producer, wherein the content object is migrated from the remote content producer, and wherein the routing information enables a remote device to obtain the received content object from the computer system.

18. The computer system of claim 17, wherein the method further comprises:
   responsive to determining that the first alternative content producer has obtained the data items identified by the namespace configuration, removing the data collection from a local content repository, which facilitates redirecting requests for the namespace to the first alternative content producer.

19. The computer system of claim 17, wherein the data-handoff condition includes one or more of:
   determining that a network throughput is above a predetermined throughput threshold;
   determining that a data storage amount is above a predetermined storage threshold;
   determining that a processor load is above a predetermined threshold;
   determining that a volatile memory usage is above a predetermined threshold;
   determining that a data-request volume is above a predetermined threshold;
   receiving a data-handoff command from a load-balancing agent; and
   receiving a data-handoff command from a system administrator.

20. The computer system of claim 17, wherein determining the namespace to replicate involves:
   selecting a namespace from a set of namespaces being hosted by a local content repository, cache, or application; and
   determining, from the selected namespace, a namespace portion that includes one or more structured name prefixes whose aggregate resource requirements are greater than a predetermined threshold.

21. The computer system of claim 17, wherein identifying the first alternative content producer involves:
   determining resource requirements associated with content objects of the namespace's data collection;
   identifying a set of alternative content producers; and
   selecting, from the set of alternative content producers, a content producer that satisfies the resource requirements.

22. The computer system of claim 17, wherein in response to the computer system being identified as the second alternative content producer by the remote content producer, the method further comprises:
   receiving, by the computer system, a plurality of content objects which are being migrated to a local cache, application, or content repository from the remote content producer; and
   wherein advertising the routing information further enables an intermediate node to update routing information for the plurality of content objects, which facilitates the remote device and other remote devices to obtain any of the plurality of content objects from the local cache, application, or content repository.

23. The computer system of claim 22, wherein synchronizing the data collection involves using a content centric network (CCN) SYNC protocol to synchronize one or more of:
   a routing configuration;
   data stored in a data repository;
   data stored in a cache;
   a user session;

a service; and
an application configuration.

24. The computer system of claim 17, wherein the computer system includes one or more of:
a network edge server;
a cache server;
a storage server;
a computer cluster;
an application server;
a sensor;
a peer device; and
an application.

* * * * *